Patented June 8, 1937

2,083,221

UNITED STATES PATENT OFFICE 2,083,221

PROCESS FOR BREAKING PETROLEUM EMULSIONS

Melvin De Groote, St. Louis, Mo., assignor to The Tret-O-Lite Company, Webster Groves, Mo., a corporation of Missouri No Drawing. Application December 24, 1936, Serial No. 117,580

10 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated for use in my process is the partial esterification product of a monocarboxy detergent-forming acid, such as a higher monobasic fatty acid, and the dihydroxy compound obtainable by condensing urea with a plurality of molecular proportions of an alkylene oxide such as ethylene oxide. The compound when derived from urea is believed to have the composition indicated by the general formula:

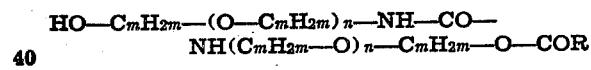

When derived from ethylene oxide the compound has the following formula:

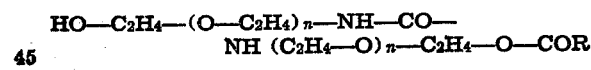

In the above formulas, $m$ represents a relatively small number and less than 10 in any event. The symbol $n$ may represent any number up to 25, but is preferably 20. R—CO represents the acyl radical derived from a detergent-forming acid.

As stated previously, the treating agent or demulsifying agent contemplated for use in the present process is derived from a monocarboxy detergent-forming acid. It is well known that certain carboxy acids may be combined with suitable alkalies, such as caustic soda, caustic potash, ammonia, triethanolamine, and the like, to produce soap or soap-like materials. Common examples of these detergent-forming acids include the higher fatty acids such as lauric acid, palmitic acid, oleic acid, stearic acid, ricinoleic acid, linoleic acid, linolenic acid, etc. as well as acids derived from rosin, such as abietic acid, and carboxy acids derived from hydrocarbon oils or associated with hydrocarbon oils, such as naphthenic acid.

It is obvious, of course, that various of the above carboxy acids can be subjected to simple modification or alteration which does not detract from their property of combining with alkalies to form soap or soap-like materials, provided that the unchanged carboxyl radical is present. For instance, oleic acid may be chlorinated or brominated and still have the same soap-forming properties as oleic acid itself. Similarly, ricinoleic acid may be acetylated without changing its detergent-forming properties. Likewise, naphthenic acids may be halogenated. It is understood that such simple modifications are the obvious functional equivalents of the unaltered carboxy acids themselves.

In the subsequent examples, for sake of brevity, reference has been made to various fatty acids. In these various examples disclosed, rosin acids, such as abietic acid, or naphthenic acid could be substituted in place of the fatty acids employed.

In some instances it is possible to use alkylated ureas (see A Textbook of Organic Chemistry, Schmidt, Rule, Second Revised Edition, 1932, page 334) in place of urea. It is understood that such alkylated ureas are the obvious functional equivalents of urea in such instances, and the term "urea" is used in its broadest sense to include such compounds. As stated in U. S. Patent #2,059,273, dated November 3, 1936, to Piggott, materials of the kind referred to can be prepared readily from directions contained in said U. S. patent, and which directions in substantially verbatim form are as follows:

Example 1

A mixture of 1 part of urea with 30 parts of ethylene oxide is heated in a closed pressure-resisting vessel at 120° C. for 9 hours. A brown mobile liquid is thus obtained and this is readily soluble in water to a clear solution. It is also soluble in ethyl alcohol. 90% of the ethylene oxide is found to have entered into combination.

14 parts of the above liquid are heated with 2.4 parts of stearic acid at 160° C. while stirring, until a sample of the mixture is completely soluble in water.

*Example 2*

In this example about 35 parts of ethylene oxide are used to 1 part of urea (cf. Example 1). 12 parts of urea and 0.1 part of caustic soda as 8% aqueous solution are charged into an autoclave which is then closed. 44 parts of ethylene oxide are then pumped in and the mixture is heated to 85–90° C. in the course of 8–9 hours. Further ethylene oxide is then pumped in as the condensation proceeds. Such by-products (glycol etc.) as are volatile are now removed by evacuating the vessel and heating it at about 100° C. until nothing more distils over. The residue, being the desired product, is then blown into a suitable receptacle. The product resembles that of Example 1; it is a brown viscous liquid, readily soluble in water and in fact miscible therewith in all proportions.

141 parts of the brown liquid are heated with 28 parts of oleic acid in an open pan at 160° C. until the melt is readily soluble in benzene.

*Example 3*

When instead of the oleic acid used in Example 2, 29 parts of ricinoleic acid are used, a dark brown greasy substance is obtained which is readily soluble in benzene and soluble in water.

*Example 4*

In Examples 1, 2 and 3 described previously, ethylene oxide is replaced by an equivalent amount of propylene oxide.

*Example 5*

In Examples 1, 2 and 3 described previously, ethylene oxide is replaced by an equivalent amount of butylene oxide.

My preferred reagent is the one described under Example 3 above.

The alkylene oxides may be considered as derivatives of glycols. Although glycerol is not ordinarily considered as a glycol, it may be considered for convenience as being a hydroxy propylene glycol and thus its oxide, that is, glycid or glycidol, may be considered as hydroxy propylene oxide. Obviously, such material, glycidol, is an obvious functional equivalent of an alkylene oxide and is considered as being included within the expression "alkylene oxide" in its broadest sense as herein employed.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the chemical compound employed as the demulsifying agent of my process may be admixed with one or more of the solvents customarily used in connection with conventional demulsifying agents. Moreover, said chemical compound may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

In practising my process a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

It is understood that the use of this process is not limited to any particular isomeric form of the chemical compound or compounds disclosed, but that one isomeric form is as suitable as another.

Having thus described my invention, what I claim as new and desire to secure by Letters Patent is:

1. A process for breaking petroleum emulsions of the water-in-oil type, which consists in subjecting the emulsion to the action of a demulsifying agent comprising the partial esterification product of a monocarboxy detergent-forming acid and the dihydroxy compound obtainable by condensing urea with a plurality of molecular proportions of an alkylene oxide.

2. A process for breaking petroleum emulsions of the water-in-oil type, which consists in subjecting the emulsion to the action of a demulsifying agent comprising the partial esterification product of a rosin acid and the dihydroxy compound obtainable by condensing urea with a plurality of molecular proportions of an alkylene oxide.

3. A process for breaking petroleum emulsions of the water-in-oil type, which consists in subjecting the emulsion to the action of a demulsifying agent comprising the partial esterification product of a naphthenic acid and the dihydroxy compound obtainable by condensing urea with a plurality of molecular proportions of an alkylene oxide.

4. A process for breaking petroleum emulsions of the water-in-oil type, which consists in subjecting the emulsion to the action of a demulsifying agent comprising the partial esterification product of a monocarboxy higher fatty acid and the dihydroxy compound obtainable by condensing urea with a plurality of molecular proportions of an alkylene oxide.

5. A process for breaking petroleum emulsions of the water-in-oil type, which consists in subjecting the emulsion to the action of a demulsifying agent comprising the partial esterification product of a monocarboxy higher fatty acid and the dihydroxy compound obtainable by condensing urea with a plurality of molecular proportions of an ethylene oxide.

6. A process for breaking petroleum emulsions of the water-in-oil type, which consists in subjecting the emulsion to the action of a demulsifying agent comprising a compound of the general formula type:

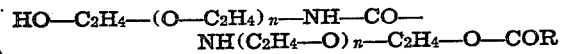

where $n$ stands for an integer up to 25, and —O—COR represents the radical of a long-chain fatty acid.

7. A process for breaking petroleum emulsions of the water-in-oil type, which consists in subjecting the emulsion to the action of a demulsifying agent comprising a compound of the general formula type:

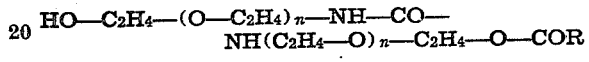

wherein $n$ stands for an integer of about 20 to 25, and R is a fatty alkyl chain of at least 11 carbon atoms.

8. A process for breaking petroleum emulsions of the water-in-oil type, which consists in subjecting the emulsion to the action of a demulsifying agent comprising the partial esterification product of a monocarboxy higher fatty acid and the dihydroxy compound obtainable by condensing urea with a plurality of molecular proportions of an ethylene oxide, and further characterized by being derived from an unsaturated fatty acid, in which R is an alkyl chain of at least 11 carbon atoms.

9. A process for breaking petroleum emulsions of the water-in-oil type, which consists in subjecting the emulsion to the action of a demulsifying agent comprising the partial esterification product of a monocarboxy higher fatty acid and the dihydroxy compound obtainable by condensing urea with a plurality of molecular proportions of an ethylene oxide, and further characterized by being derived from ricinoleic acid.

10. A process for breaking petroleum emulsions of the water-in-oil type, which consists in subjecting the emulsion to the action of a demulsifying agent comprising a material obtained by condensing urea with a plurality of molecular proportions of ethylene oxide and then treating the so-obtained compound in such a manner as to introduce a ricinoleyl radical.

MELVIN DE GROOTE.